United States Patent
Anzai et al.

[11] Patent Number: 5,983,688
[45] Date of Patent: Nov. 16, 1999

[54] METHOD AND APPARATUS FOR DISPLAYING DIE LAYOUT IN PRESS BRAKE AND FOR CHECKING INTERFERENCE

[76] Inventors: Tetsuya Anzai; Sunao Haga; Takara Kibe; Katsumi Koyama; Takahiro Shibata, all of 350, Ishida, Isehara-shi, Japan

[21] Appl. No.: 08/832,509

[22] Filed: Apr. 2, 1997

Related U.S. Application Data

[60] Provisional application No. 60/021,355, Jul. 8, 1996.

[51] Int. Cl.$^6$ ........................................... B21D 5/02
[52] U.S. Cl. .......................... 72/15.1; 72/31.1; 72/31.12
[58] Field of Search ........................... 72/15.1, 461, 31.1, 72/31.11, 31.12

[56] References Cited

U.S. PATENT DOCUMENTS

| | | | |
|---|---|---|---|
| 4,486,840 | 12/1984 | Klein et al. | 364/474 |
| 4,633,720 | 1/1987 | Dybel et al. | 73/764 |
| 4,812,985 | 3/1989 | Hambrick et al. | 364/478 |
| 5,005,394 | 4/1991 | Sartorio et al. | 72/31.1 X |
| 5,211,045 | 5/1993 | Shimizu | 72/22 |
| 5,419,169 | 5/1995 | Kirii | 72/8 |
| 5,528,918 | 6/1996 | Kirii | 72/15.1 |
| 5,595,560 | 1/1997 | Kamanda | 483/1 |

FOREIGN PATENT DOCUMENTS

| | | |
|---|---|---|
| 1-271013 | 10/1989 | Japan . |
| 3-99730 | 4/1991 | Japan . |
| 91012908 | 9/1991 | WIPO . |

*Primary Examiner*—Joseph J. Hall, III
*Assistant Examiner*—William Hong
*Attorney, Agent, or Firm*—Greenblum & Bernstein, P.L.C.

[57] ABSTRACT

A press brake is provided for performing one or more bending operations on a product, such as a sheet metal part, whereby the selection and laying out the clues necessary for bending the product is facilitated by detecting the kinds and layout of the dies loaded in the press brake. A display device is also provided for displaying the layout of the dies, checking interferences between the product and the dies, and displaying the details and features of the product.

20 Claims, 9 Drawing Sheets

METHOD AND APPARATUS FOR DISPLAYING DIE LAYOUT IN PRESS BRAKE AND FOR CHECKING INTERFERENCE

RELATED APPLICATION DATA

This application claims the benefit of U.S. Provisional Application 60/021,355 (Attorney Docket No. V14831), filed on Jul. 8, 1996, entitled "Press Brake, Method For Displaying Die Layout In Press Brake And Method And Apparatus For Checking Interference", the disclosure of which is expressly incorporated herein by reference in its entirety.

BACKGROUND OF THE INVENTION

1. Field of the Invention

The present invention relates to a press brake. More particularly, the present invention relates to a press brake which allows easy selection and laying out of dies during bending of a product by detecting the kinds and layout of the dies loaded in the press brake, indicating the layout of the dies and the details of a workpiece and the product, and checking interference between the workpiece and the dies when the product is to be bent.

2. Prior Art

Conventionally, where lengths and shapes of a plurality of bent spots or bend lines in a bent product are different from one another, a plurality of spots in a workpiece have often been bent in sequence with one press brake by loading and properly spacing a plurality of dies in the press brake.

When a plurality of spots in a workpiece are to be bent by loading a plurality of dies in the press brake, the kinds and layout of the dies to be used are recorded in a work sheet so as to facilitate easy selection of the dies when bending of the same product is carried out again. However, this recording work is burdensome.

For a new product, such as a sheet metal part, a worker must consider the kinds and arrangement of dies according to a bending sequence of the product. It was thus troublesome to select and arrange dies in accordance with bending of a new product.

It is necessary to check interferences between a workpiece and dies for bending of the workpiece. Traditionally, it was rather difficult to see the workpiece and the dies, because they were stereoscopically shown in a display device.

Furthermore, when the whole picture of the product and the workpiece was displayed, for instance where the workpiece was long, it was difficult to see the picture because of thin or incomplete displaying of portions of the product or workpiece in the vicinity of end parts or feature sections.

SUMMARY OF THE INVENTION

The present invention was made to solve to the above-noted problems, and an object of the present invention is to provide a press brake which allows easy selection and laying out of dies during bending of a product by detecting the kinds and layout of the dies loaded in the press brake, indicating the layout of the dies and the details of a workpiece and the product, and checking interference between the workpiece and the dies when the product is to be bent.

According to a first aspect of the invention, a press brake is provided with a scanner for reading reference numbers and symbols given to dies loaded in the press brake and a position detecting device for detecting the moving position of the scanner.

According to a second aspect of the invention, the press brake of the first aspect of the invention is further provided with a memory for correlating position data detected by the position detecting device with data read by the scanner and for storing the correlated data, and a display device for displaying the correlated data stored in the memory.

According to a third aspect of the invention, a method for displaying die layout in the press brake is provided. The method is composed of the following steps: (a) displaying of a die corresponding to a maximum bending length of a product to be processed; (b) displaying of a diagram and a bend line of a bending sequence of the product to be processed corresponding to the displayed die; (c) determining as to whether or not it is possible to perform bending by moving the displayed diagram corresponding to the displayed die; (d) registering the die if it is determined to be YES in step (c) and displaying a new die corresponding to the length of a bend line if its NO; (e) determining as to whether or not it is possible to replace the one for previous bending by the new die; and (f) changing of the registration by erasing the previous relevant die if it is determined to be YES in step (c), or displaying again of the diagram for next bending by returning to step (b) if it is NO and completing the whole bending process.

According to a fourth aspect of the invention, a die layout display system is provided for use with a press brake. The system comprises a first storage device in which product processing data such as lengths of bending lines, bending sequences and dimensions of bending shares are stored, a second storage device in which data regarding lengths and dimension of dies is stored, a display device controller for displaying workpiece shapes for each bending sequence by fetching the data from the first storage device and displaying a die corresponding to the bending line length of the workpiece shown in the display device by fetching the dimension data of the die stored in the second storage device, and a movement instructing device for providing an instruction, to the display device controller, to move the workpiece shown in the display device.

According to a fifth aspect of the invention, an apparatus and method for checking die interferences is provided. A first memory is provided in which stereoscopic graphic data of a product is stored. The apparatus also includes a second memory in which cross-sectional shape data of a die needed for bending of the product is stored, a display device and a display device controller. The method includes the steps of fetching edge shape data of the designated cross-sectional portion of the product shown in the display device from the first and second memories into the display device controller, and displaying the edge shape of the designated cross-sectional portion of the product and the cross-sectional shape of the die in combination in the display device.

According to a sixth aspect of the invention, a method for checking die interferences is provided. The method comprises the steps of: fetching three-dimensional shape data of a die and a workpiece and displaying this data in a display device; indicating a position for checking workpiece interferences and a sight line direction or a display screen; displaying the shapes of the die and the workpiece in the indicated sight line direction; performing virtual bending of the workpiece on the display screen; and determining whether the sum of the cross-sectional area of th workpiece in the indicated position and the cross-sectional area of the die is smaller than a fixed number or not, continuing the virtual bending process if its answer is NO, stopping the same if its answer is YES and performing checking of interferences.

According to a seventh aspect of the invention, a method for checking press brake interferences is provided. The method comprises the steps of: fetching three-dimensional data of an object to be interfered with and an object to be observed from a memory and displaying this in a display device; indicating a position of the observed object for performing interference checking and a sight line direction on a display screen; displaying the shapes of the interfered object and the observed object in the indicated sight line direction; moving the observed object toward the interfered object on the display screen; determining whether the sum of the cross-sectional area of the interfered object and the cross-sectional area of the designated portion of the observed object is smaller than a fixed number of not; and continuing the movement if the result of determination is NO, stopping the movement if YES and checking interferences.

According to an eighth aspect of the invention, a method for displaying long parts by shortening the lengths thereof is provided. The method includes the steps of: displaying long parts in a display device; scanning the shapes of the displayed parts in the longitudinal direction thereof with specified pitches; determining whether coordinate data regarding a line position representing the shapes of the parts is the same as that during scanning of a previous time or not; omitting this data if the result of determination is YES or repeatedly registering the coordinate data if NO; and displaying the long parts by unfolding the registered coordinate data again after completion of scanning.

According to a ninth aspect of the invention, the method for displaying the long parts with the lengths made short as noted in the eighth aspect of the invention further includes a step of displaying, when the long parts are to be displayed by unfolding the registered coordinate data again, the parts by magnifying these by a desired amount.

The nature, principle and utility of the invention will become more apparent from the following detailed description when read in conjunction with the accompanying drawings.

DETAILED DESCRIPTION OF THE INVENTION

Figure 1:
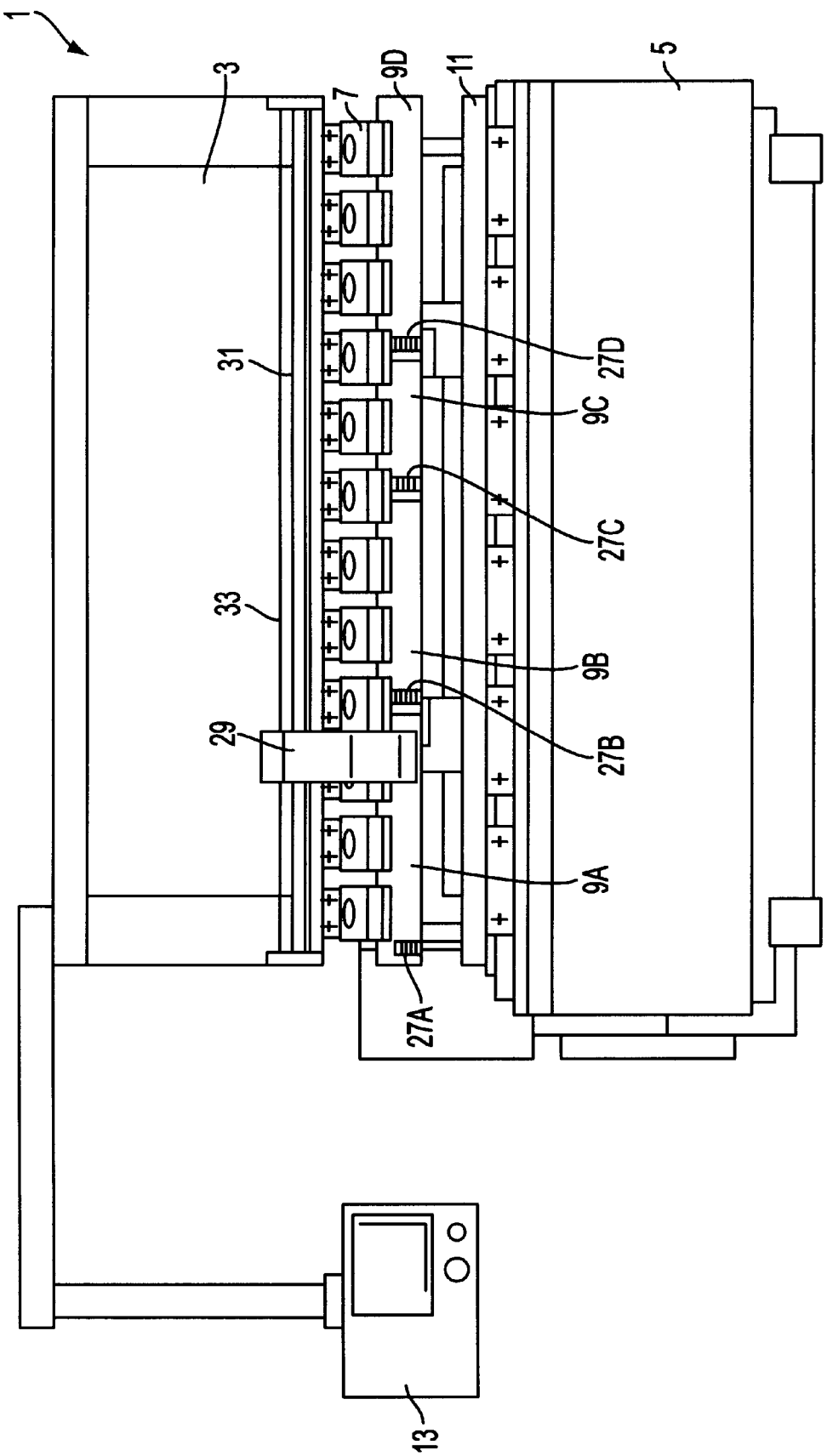
FIG. 1 is a front view of a press brake implemented according to an aspect of the present invention.

Referring to FIG. 1, a press brake 1 in an illustrated example is provided with an upper frame 3 and a lower frame 5 placed oppositely to each other in upper and lower parts. Either the upper frame 3 or the lower frame 5 is provided as a movable frame so as to be movable in a vertical direction. A vertical motion actuating device (not shown), for instance a hydraulic cylinder or a servo motor, is also provided to move the movable frame up and down.

A plurality of bending tools or punches 9A, 9B, 9C and 9D are attachably/detachably and replaceably attached to the upper frame 3 via a plurality of intermediate plates 7. A die 11 corresponding to one of the punches 9A–9D is attached to the lower frame 5. In the example, only one die 11 is shown. In actuality, however, depending on the bending shapes of a workpiece (not shown in FIG. 1), a plurality of dies corresponding to the respective punches 9A–9D may be attached.

The press brake 1 is further provide with a controller 13, for instance an NC device or a small computer, for controlling each controlled shaft of the press brake 1.

Figure 2:
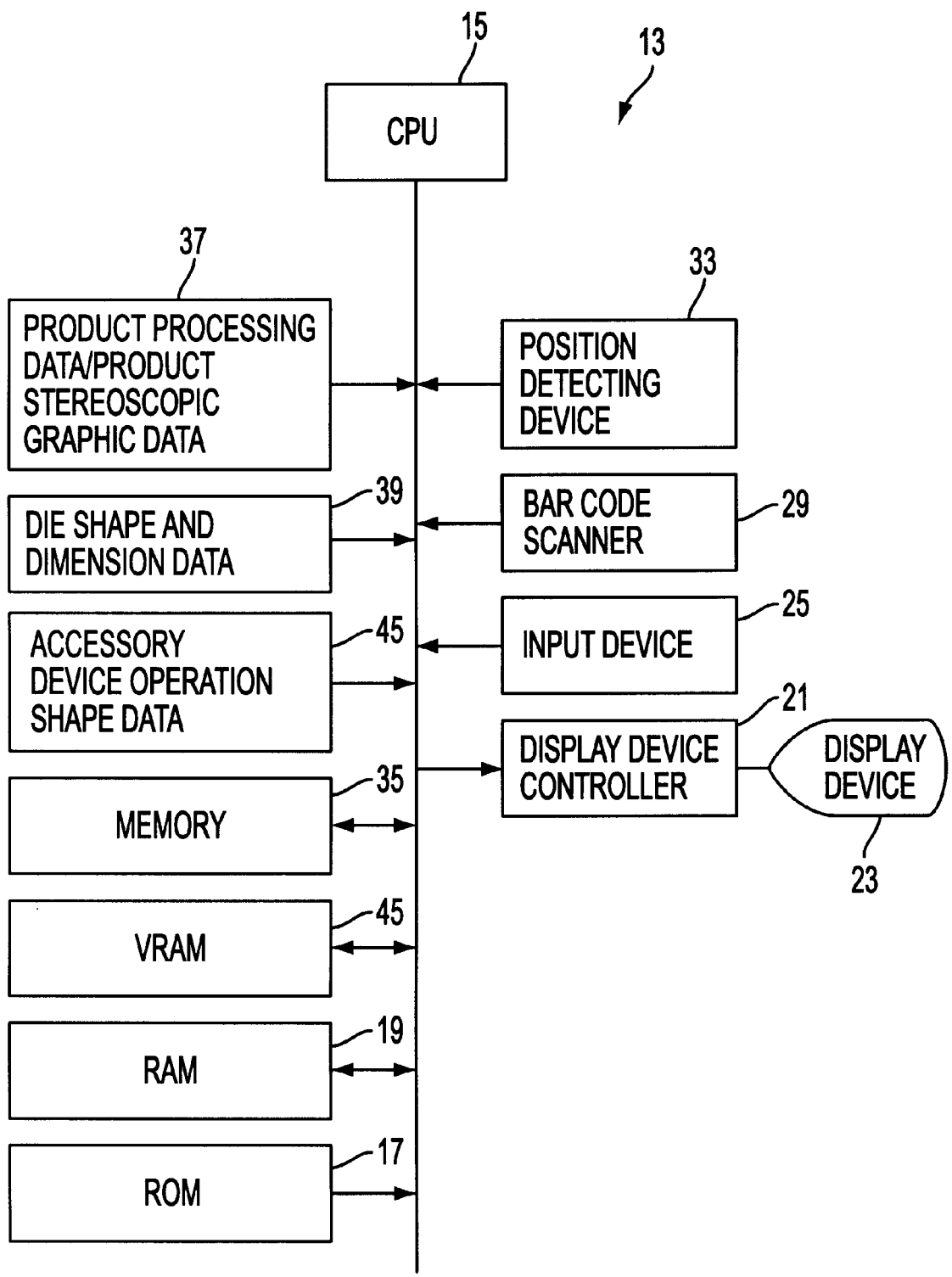
FIG. 2 is a functional block diagram illustrating a structure of a controller of a press brake.

The controller 13, as shown in FIG. 2, may be provided with a CPU 15. The CPU 15 is connected to ROM 17, a RAM 19, and a display device 23, for instance, a CRT via a display device controller 21 such as a CRT controller and the like. An input device 25, for instance a keyboard or a mouse, is also connected to the CPU 15 when necessary.

Bar codes 27A–27D of reference numbers and symbols representing data regarding the punches 9A–9D, including their shapes, dimensions, manufacturing dates an die numbers, are attached to the punches 9A–9D. In order to read these bar codes 27A–27D, a scanner 29 capable of moving in left and right directions, for instance an image pickup unit or a bar code scanner, is provided.

More particularly, in the example, the scanner 29 is supported by a guide member 31 provided in the upper frame 3 in left and right directions so as to be movable in left and right directions. In order to detect the moving position of the scanner 29 in the left or the right direction, a linear scale, for instance a magnetic scale, is provided as a position detecting device 33.

In the above-noted configuration, when the scanner 29 is moved in left and right directions along the guide member 31, its moving position, for instance one from the reference position of a left edge, is detected by the position detecting device 33 and when the scanner 29 comes to each of the bar codes 27A–27D of the punches 9A–9D, each of the same is read.

Data regarding each of the bar codes 27A–27D read by the scanner 29 and detected position data detected by the position detecting device 33 are correlated with product numbers by the CPU 15 in the controller 13 and stored in a memory 35. Memory 35 may comprise an external storage device, such as a floppy disk or a hard disk. The data stored in this memory 35 is displayed in the display device 23 by retrieving the product number.

Therefore, after the plurality of punches 9A–9D and the plurality of dies 11 are loaded in order to prepare for bending of a certain product, the arranged positions of the necessary punches and the respective punches can be detected by moving the scanner 29 in the left and right directions along the guide member 31 and reading the bar codes 27A–27D attached to the punches 9A–9D. The position data of the respective punches 9A–9D and data regarding die shapes, dimensions, etc., can be stored in the memory 35.

When the same product is to be bent again, the dies necessary for this work can be placed in the same positions again by reading data regarding the same product number from the memory 35, displaying this in the display device 23 or printing this by means of a printer, etc., and arranging the dies in accordance with this display or the print. As a result, when bending of the same product is repeated, it is possible to improve work performance by quickly preparing the dies.

In the above example, the scanner 29 was moved manually. However, the scanner can be configured to be moved automatically by using a ball screw mechanism, etc., rotated by the linear motor or the servo motor. In addition, the bar codes can be provided in the die 11 sides and the scanner can be provided in the lower side.

Furthermore, another way of configuration is possible, wherein the controller 13 is properly connected to a host computer (not shown), the position data of the punches (dies) 9A–9D and data regarding die shapes and dimensions are stored in the memory of the host computer, the stored data is read out to the controller provided in another press brake connected to the host computer and the position data of the dies (punches) 9A–9D and the data regarding die shapes and dimensions are utilized in this press brake. This makes it possible to easily lay out the necessary dies when bending of a product, already bent once, is to be performed again.

The scanners 29 and others noted above are useful for detection of the arranged positions, shapes and dimensions of the dies loaded in the press brake. However, when a product is new, it is necessary to set anew the layout of the dies for bending of this product.

Thus, the controller 13 in the example is provided with a product data memory 37 connected thereto for storing product processing data including bend line lengths, bending sequences, bent shapes and dimensions, product stereoscopic graphic data according to the bending sequence and the like. A die data memory 39 for storing necessary die data including die shapes and dimensions is also connected to the controller.

The product data memory 37 and the die data memory 39 may be provided in the host computer. These can be configured to be placed in the RAM 19 of the controller 13 via communication means when necessary. In this case, it is possible to control a memory capacity to be small in the controller 13.

Figure 3:
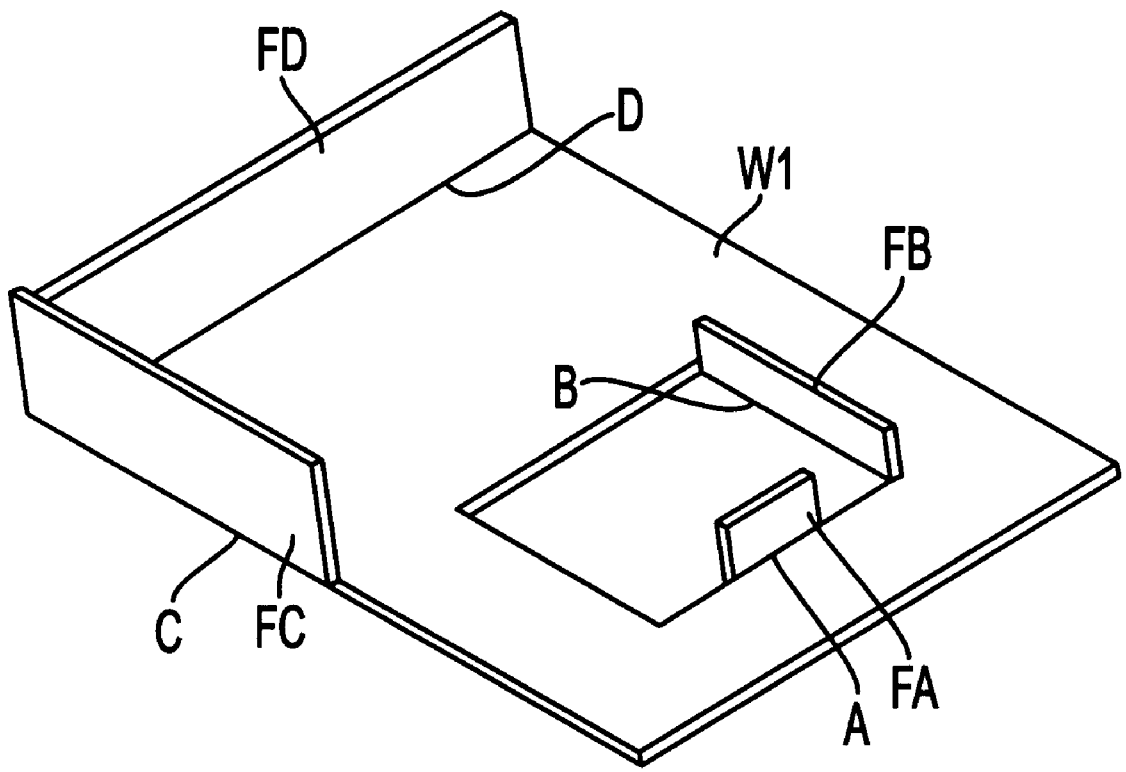
FIG. 3 is a stereoscopic diagram showing an example of a product.

Referring to FIG. 3, there is shown a case where bending of a product W1, such as a sheet metal part, having bent portions FA, FB, FC and FD bent along bend lines A, B, C and D, respectively, is performed in the order of the bend lines D, C, A and B. A method for displaying the die layout in the display device 23 in such a case will be described below, with reference to FIGS. 3–5.

Figure 4A:
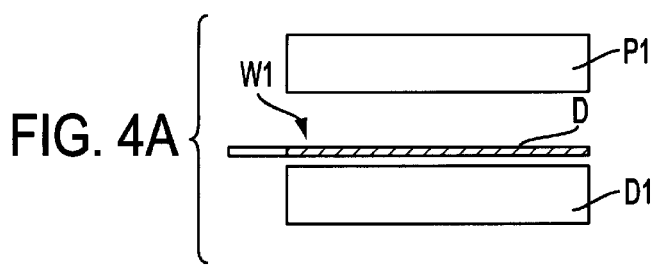
FIGS. 4A–4E are views illustrating a method for displaying die layout.
Figure 4B:
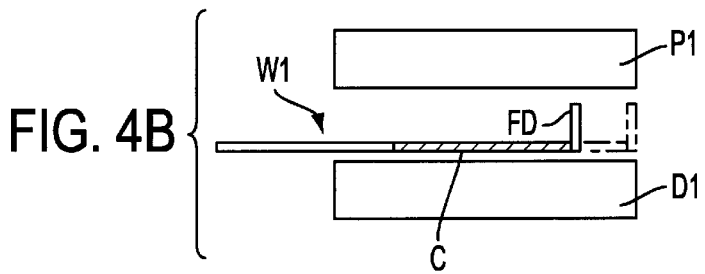
Figure 5:
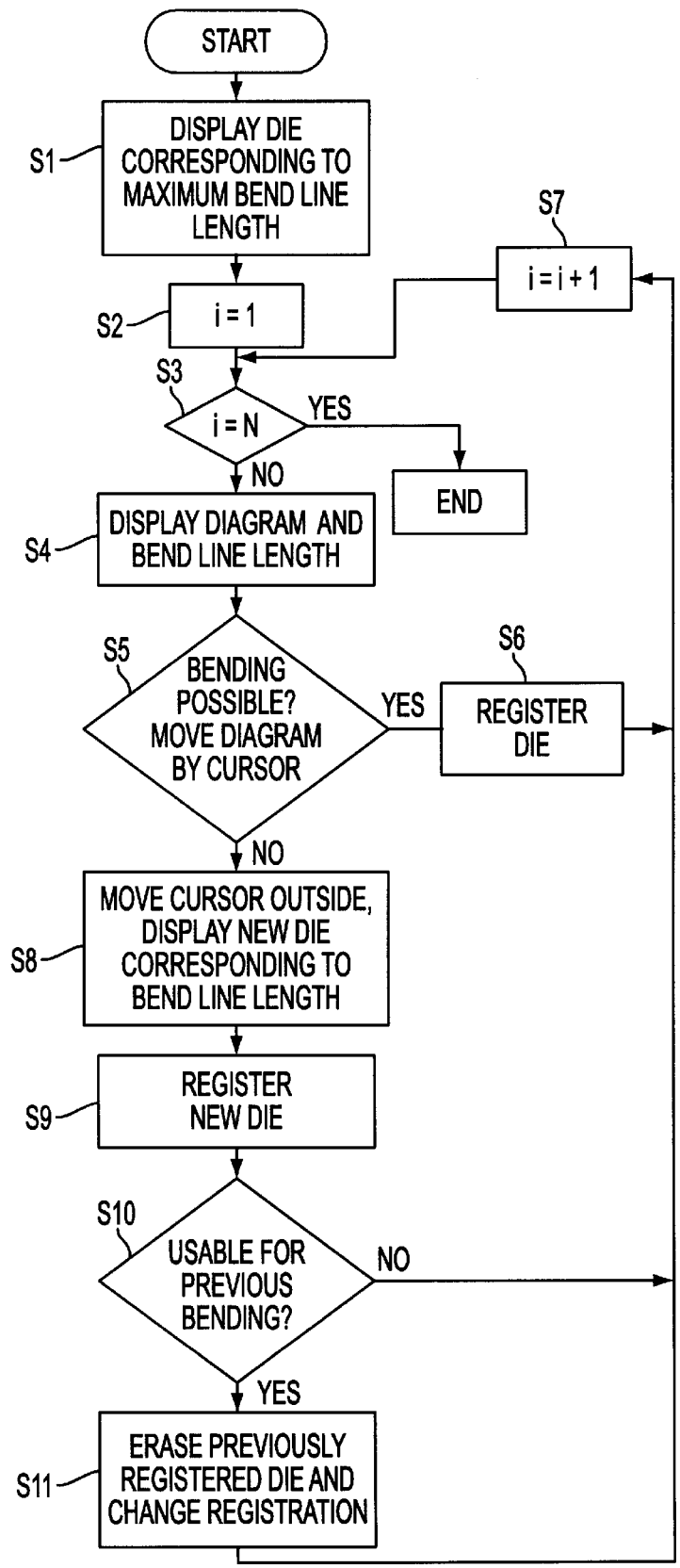
FIG. 5 is a flow chart showing a method for displaying die layout.

In step S1, in order to analyze the die layout and a bending order or sequence of a product W1, the bend line D having a maximum bending length is retrieved from the data stored in the product processing data memory 37 for the product W1 and the first dies (punch aid die) P1 and D1 corresponding to the bend line D are displayed in the display device 23 (see, for example, FIG. 4A).

Then, in step S2, the bending order or step (i) is initialized and set to 1 and, in step S3 determination is made as to whether the last bending number of times (i=N) has been reached or not and if YES, the process is finished. In step S3, if the result of determination is NO, then the diagram of the bending order set in step S2 and the length of the bend line are displayed between the die P1 and D1 (see, for example, step S4).

For the product W1 shown in FIG. 3, since the longest bend line is the bend line D and its bending order is first, the dies P1 and D1 corresponding to the length of the bend line D are displayed along with the bend line D, as shown for example in FIG. 4A.

In step S5, by seeing the display of the punch P1 and die D1 and the bend line D, as shown in FIG. 4A, determination may be made by an operator as to whether it is possible to perform bending along the bend line D or not. In this case, since there are no interferences between the punchi P1 and die D1 and the product W1, and bending along the bend line D can be performed, the process proceeds to step S6, whereby operating the input device 25, the punch P1 and die D1 are related to the bend line D and registered. The registration of the dies for each bend line may be performed by soaring the same in memory or an external storage device, such as memory device 35.

Then, the process proceeds to step S7 where the bending order (i) is incremented by 1 and then, at step S3, it is determined whether the last bending step (i=N) was reached. In this example, since the bending order i does not equal N, the bend line C as the second in the bending order is displayed between the punch P1 and die D1 (see, for example, step S4 and FIG. 4B). In this case, since the bent portion FD has been created as a result of bending along the bend line D, this bent portion FD is displayed together with the product W1 and the dies P1 and D1.

Then, in step S5, determination is made as to whether it is possible to perform bending along the bend line C or not. In this case, since there are interferences between the bent portion FD and the dies P1 and D1, the diagram of the product W1 may be moved in left and right directions by operating, for example, the input device 25, to a position at which the bent portion FD is away from the ends of the punch P1 and die D1 (see, for example, FIG. 4B). The processe then proceeds to step S6, where the dies are registered as in the previous case.

Figure 4C:
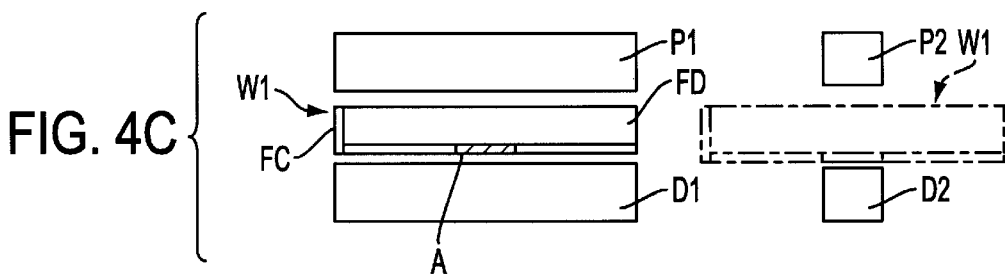
Figure 4D:
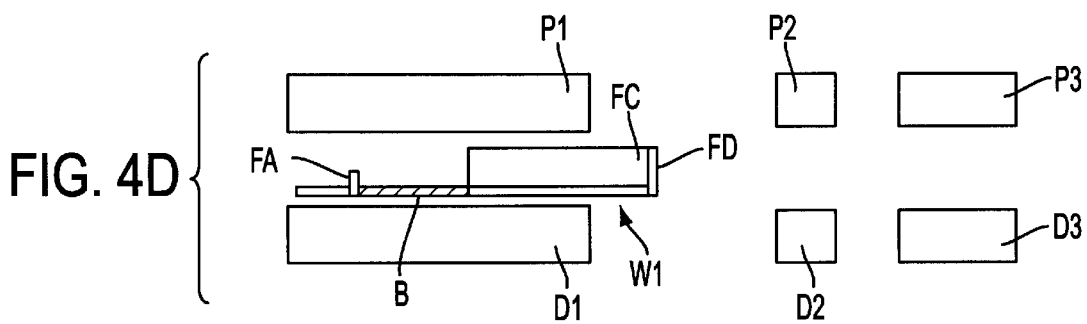

Then, at step S7, the bending order i is again incremented by 1 (step S7) and since a third step in the bending order is the bend line A, the bend line A is displayed between the punch P1 and die D1 with the bent portions Fd and FC bent (see, for example, step S4 and FIG. 4C). The diagram of the product W1 may then be moved to the left and right directions and the determination may be made as to whether it is possible to perform bending along the bend line A. In this case, since bending cannot be carried out, the process proceeds to step S8, whereby moving the diagram of the product W1 to a position away from the punch P1 and die D1, data regarding new second dies (punch P2 and die D2) corresponding to the bend length of bend line A is read from the die data memory 39 and displayed, as shown for example in FIG. 4C.

In this case, by using the second dies P2 and D2, it is possible to perform bending along the bend line A. Thus, the process proceeds to step S9, where these dies are registered according to a similar process to that used in step S6. Then, in step S10, determination is made as to whether it is possible to perform bending along any of the previous bend lines D and C with respect to the second punch P2 and die D2. As the result of determination is NO, the process moves to step S7.

Then, the process is executed in order to perform bending along the bend line B as a fourth step in the bending order. The diagram of the product W1 is displayed between the first dies P1 and D1 and determination is made as to whether it is possible to perform bending along the bend line B with the dies P1 and D1 or not. If the answer is NO, the diagram of the product W1 is moved to the positions of the second punch P2 and die D2. If the result of determination is still NO even with the second punch P2 and die D2, by further moving the diagram of the product W1 to the side, new third dies (punch P3 and die D3) corresponding to the bend length of bend line B are displayed (see, for example, step S8 and FIG. 4D).

Thereafter, in step S9, the third punch P3 and die D3 are registered as in step S6 and, in step S10, determination is made as to whether it is possible to perform bending along any of the previous bend lines D, C and A with the third dies P3 and D3 or not. In this case, the bend Lines D and C are longer than the bend line B and bending therealong is impossible. However, since the bend line A is shorter than the bend line B, the diagram of the product W1 of FIG. 4C is displayed again corresponding to the third punch P3 and die D3 and determination may be made by an operator as to whether it is possible to perform bending along the bend line A with the third punch P3 and die D3 or not. If YES, the process proceeds to step S11, whereby operating the input device 25, the second punch P2 and die D2 are erased, the bend line A is related to the third punch P3 and die D3 and a change is made to the registration.

Figure 4E:
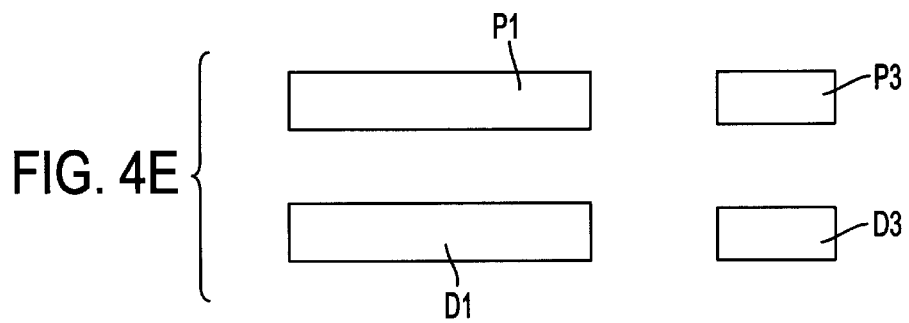

When the dies, registered in the memory, are displayed in the display device 23 after repeating the above-noted operations, the layouts of first punch P1 and die D1 and the third punch P3 and die D3 are displayed for the product W1 (see, e.g., FIG. 4E).

Therefore, by loading the necessary dies in the press brake in accordance with the displays in the display device, the dies needed for bending of the produce W1 are laid out. This allows for easy laying out of the dies. In other words, even when a product targeted for bending is new, it is possible to lay out the dies relatively easily.

As described above, when bending of a product is performed by placing a plurality of dies in the press brake, it is relatively easy to check for interferences between the dies and the product if the shape of the product is relatively simple. As a method for carrying out checking of interferences between the product and the dies, one including the steps of stereoscopically displaying the product and the dies and displaying these by changing the colors of interfered portions may be considered. However, if the shape of the product is complex, it may be difficult to see the interfered portions. Also, it may be possible to carry out interference checking, for instance, by displaying in combination the side view or the cross-sectional view of the product shape, and the side view or the cross-sectional view of the dies. However, in the side and cross-sectional views, a side immediately before a portion targeted for interference checking is simultaneously displayed and, thus, it may be difficult to see the interfered portion if the shape is complicated.

In view of this, the invention provides another novel method for checking interferences. This method will be described hereinbelow.

Figure 6A:
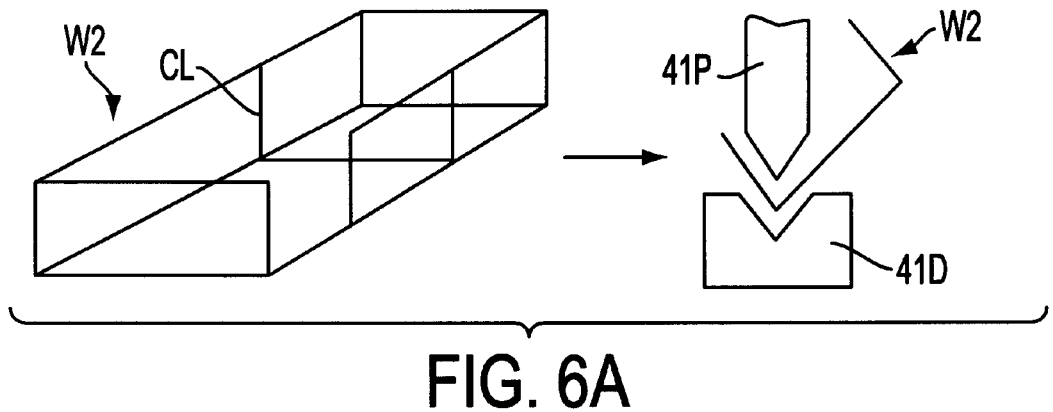
FIGS. 6A and 6B are views illustrating a display part for checking interferences between a product and a die.
Figure 6B:
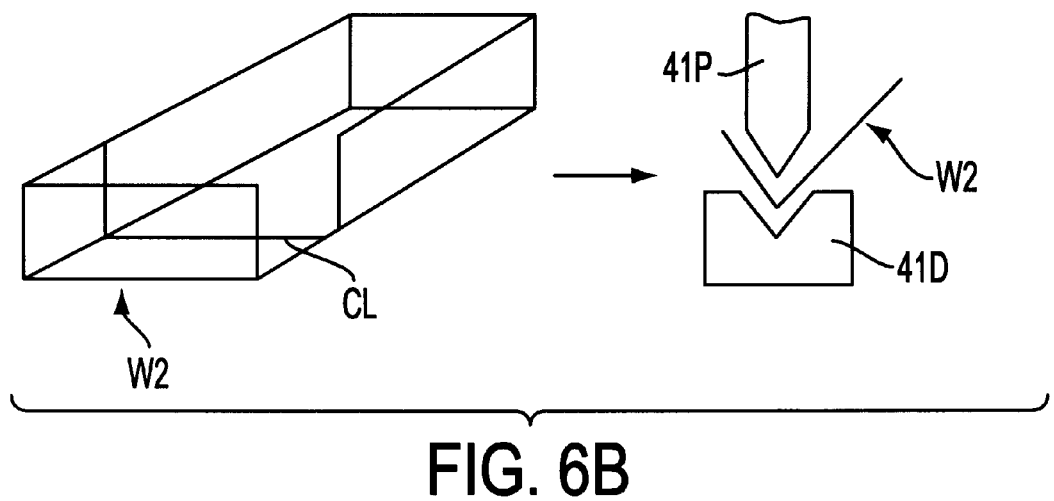

Referring to FIGS. 6A and 6B, there are shown a display of the stereoscopic shape of a product W2 made on the display device based on stereoscopic graphical data regarding the product W2 stored in the product data memory 37 and a display of a cut line CL representing the cutting position of the product W2 therein (i.e., an intersection line that appears when the product W2 is cut by a virtual plane). There is also illustrated a display, in combination on the display device 23, of the edge shape of the product W2 cut along the cut line CL and the edge shapes of necessary dies (punch 41P and die 41D) stored in the die data memory 39.

In the above-noted configuration, a cut edge shape can be obtained by moving the cut line CL to an optional position of the shape of product W2 stereoscopically displayed. Further, since this edge shape and those of the punch 41P and die 41D are displayed together, a diagram displayed for interference checking can be made simple and the interference checking position of the product W2 and the existence of interferences between the product W2 and the dies can be easily found by visual inspection.

Figure 7:
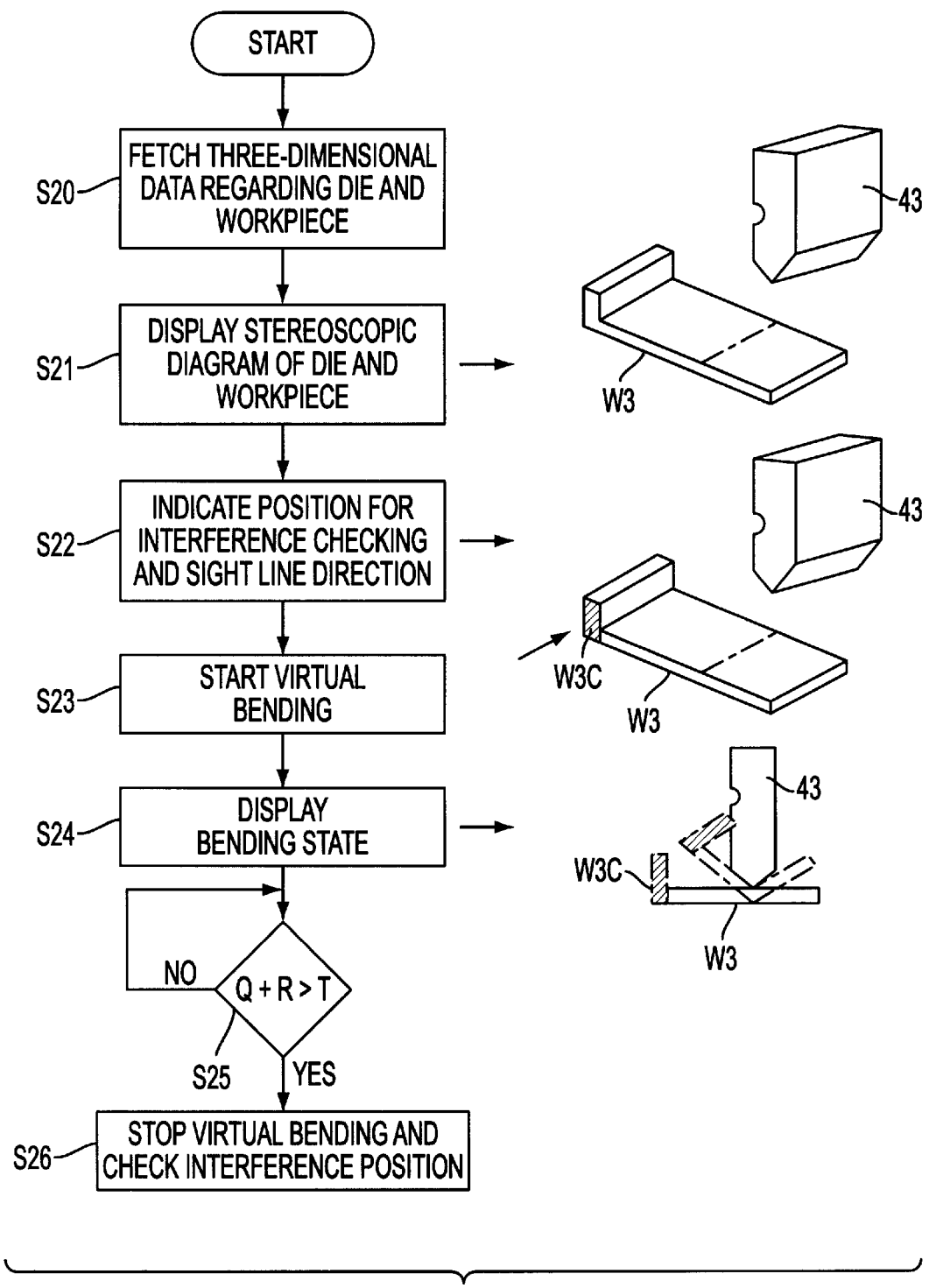
FIG. 7 is a flow chart showing another method for checking interferences between a product and a die and a view illustrating the same.

It is possible to adopt another approach for checking of interferences between dies and a product, as described hereinbelow. Referring to FIG. 7, in step S20, three-dimensional data regarding a product W3 and a die 43 is fetched from the data memories 37 and 39 and, then, at step 21, the product W3 and the die 43 are displayed on the display device 23.

Then, after the position to be checked for interferences of the product W3 and a sight line direction are indicated at step S22 by, for instance, arrows on the display screen, the shapes of the product W3 and the die 43 are displayed in the indicated sight line direction at step S23. Then, at step S24, the virtual bending state of the product W3 is displayed. At step S25, the cross-sectional area T may be calculated, for each incremental step or stage of the virtual bend, based on the sum of the cross-sectional area of the indicated interference checking position W3C of the product W3 and the cross-sectional area of the die 43, as displayed on the display device 23. Determination may then be made as to whether the calculated cross-sectional area T is smaller than the sum of the fixed, independent cross-sectional area Q of the indicated interference W3C of the product W3 and the fixed, independent cross-sectional area R of the die 43. If the calculated area T is smaller than the fixed sum of Q and R, then it can be determined that interference has occurred. On the contrary, if the calculated area T is not smaller than the fixed sum of Q and R, then it can be determined that no interference has occurred.

Therefore, in step S25, if Q+R=T, then virtual bending is continued. However, if Q+R>T, then the process proceeds to step S26, where virtual bending is stopped and checking may be made on the interference position.

Explanation was made of a case where interferences between the product and the dies are to be checked. In addition, it is possible to check interferences among the dies, the product and accessory devices by fetching data regarding the operations and shapes of such accessory devices as a robot, a manipulator and the like from a memory 45 (see, for example, FIG. 2), displaying the diagram of the accessory devices on the display device 23 related to the product W3, and carrying out steps similar to steps S22–S26 in the previous example described above.

Therefore, where a workpiece is to be supplied to the press brake by using a robot, etc., it is easy to check interferences between the robot and the dies, thereby preventing abutting of the robot against the dies.

The developments of a product and parts and the shape of the whole product may be displayed for bending of the long parts and product. In this case, for example, if a product is long and its aspect ratio is extremely big, the feature portions of the product may be displayed being "crashed", making it impossible to accurately recognize the feature portions.

For this reason, as shown in the above example, the invention provides an approach for clearly displaying feature points regarding the product shapes and the developments even when the product is long.

More particularly, a video RAM 45 is connected to the controller 13. When a development showing a long product W4 or its bend line is displayed in the display device 23, if its aspect ratio is big and its feature points are crashed, image data regarding the shape of the long product W4 is fetched into the video RAM 45 and scanning of the image data, which may comprise pixel intensity data, is performed by CPU 15 in the longitudinal direction of the product W4 with specified pitches. The scanning pitch may be a fixed amount (e.g., based on a desired resolution) or may be variable with the detection and scanning of the feature portions of the part (i.e., a finer scanning pitch may be used to provide a higher resolution when scanning detailed or feature portions of the part).

Figure 8:
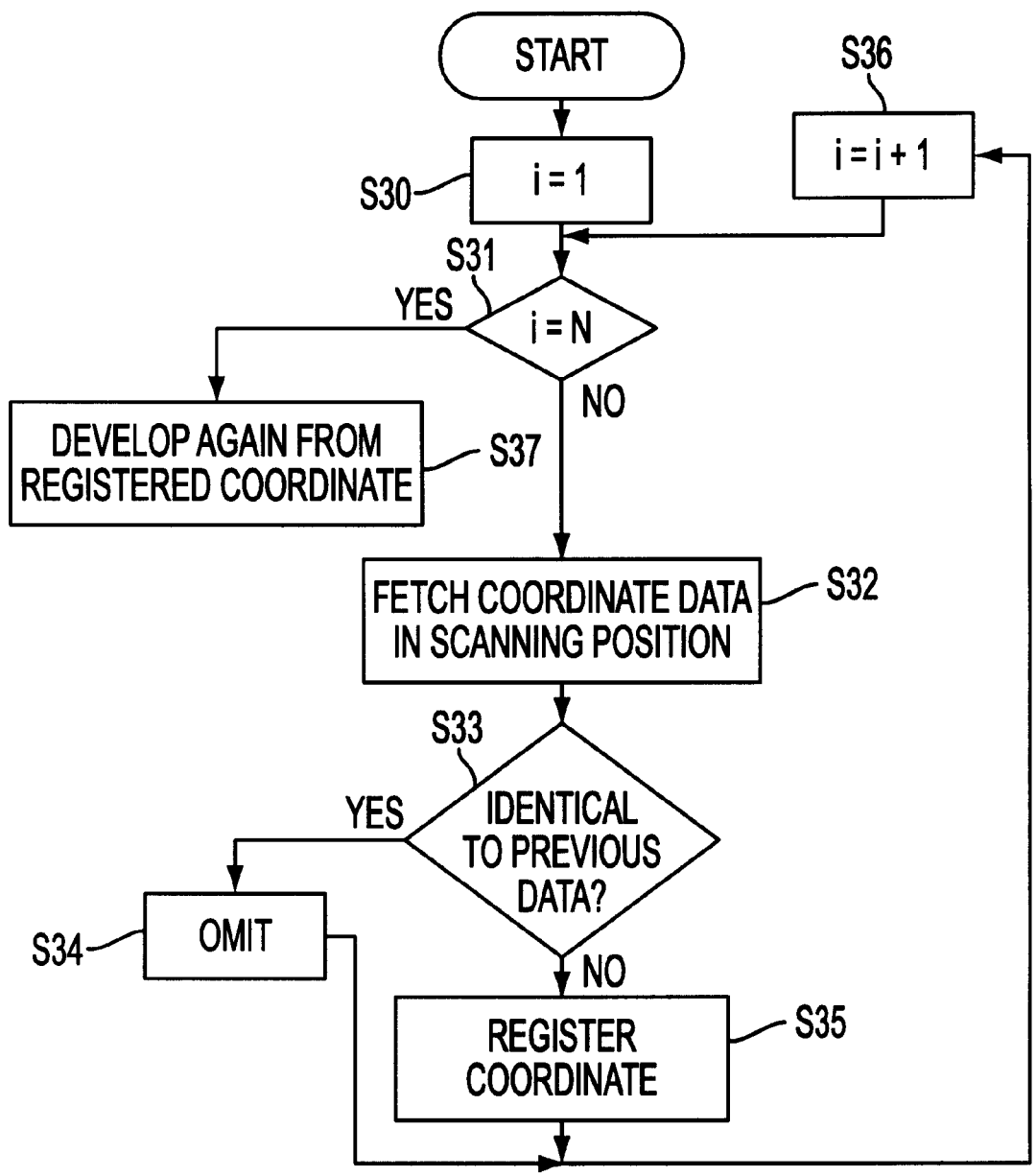
FIG. 8 is a flow chart showing an exemplary case where a diagram of a long product is reduced in size in its longitudinal direction.

That is, in step S30 of FIG. 8, the scanning line (i) is set to 1 (i.e., to a first scanning line L1) by CPU 15 and in step S31, determination is made as to whether scanning has been completed over the entire area of the image data in video RAM 45 or not (i.e., whether i=N). Then, in step S32, when the scanning line intersects the development including the bend line or the diagram of the product W4, coordinate data in a position orthogonal to the scanning direction is fetched and, in step S33, determination is made as to whether the previous coordinate data and the current coordinate data are identical or not. If identical, the process proceeds to step S34, where the current coordinate data is omitted. Thereafter, the process continues to step S36 to increment to the next scanning line.

If the current coordinate data is determined not to be identical to the previous coordinate data in step S33, the process proceeds to step S35, where the current coordinate data is temporarily registered in the RAM 19 as the data adjacent to a previous registered data with respect to the longitudinal direction of the product W4. Then, in step S36, by incrementing the scanning line (i) and using a new scanning line, the process is repeated from step S31 to S36. When scanning over the entire area of the video RAM 45 is completed by CPU 15 (i.e., when i=N), the process proceeds to step S37, where the diagram is developed again based on all of the coordinate data registered in the RAM 19 at step S35.

Figure 9A:
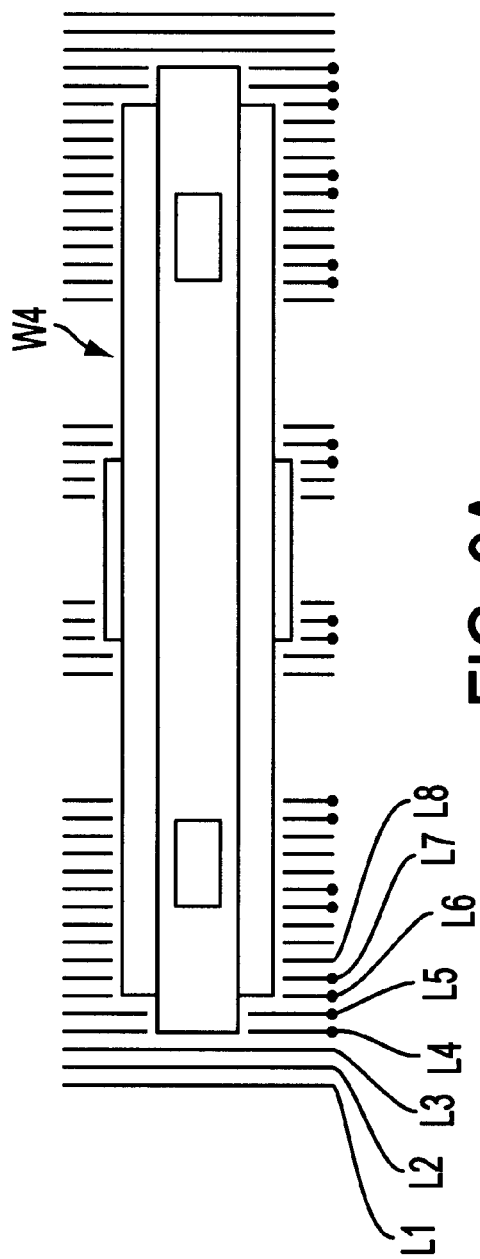
FIGS. 9A–9C are views illustrating a case where a diagram of a long product is reduced in size in its longitudinal direction, displayed by unfolding this again and displayed in an expanded manner.

As shown in FIG. 9A, since a scanning line L4 intersects the diagram of the product W4 while scanning lines L1, L2 and L3 do not intersect the product W4, a coordinate position in its intersecting location is fetched and temporarily registered in RAM 19. Then, a coordinate position in the intersection between a scanning line L5 and the diagram is fetched, compared with that for the scanning line L4 and registered in the RAM 19 because it is different. Further, scanning is carried out sequentially for scanning lines L6 and L5, L7 and L6 and L8 and L7, etc., coordinate positions in locations crossing the diagram are compared for the respective cases and only the coordinate positions different from the previous are registered in the RAM 19 as the data adjacent to a previous registered data with respect to the longitudinal direction of the product W4. By transferring and storing the registered coordinate data from RAM 19 into the video RAM 45, a view like that shown in FIG. 9B is obtained.

Figure 9B:
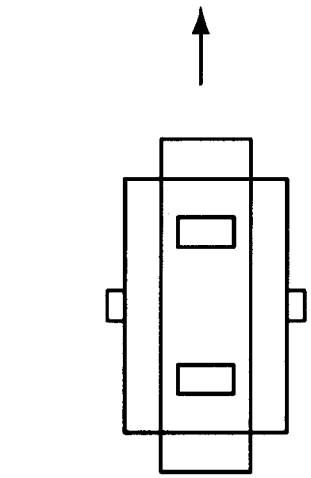
Figure 9C:
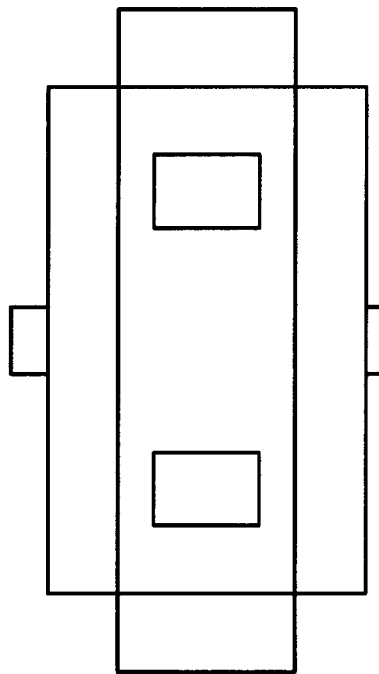

As shown in FIG. 9B, if a displayed diagram is small, by magnifying it by a desired amount, an expanded view like that shown in FIG. 9C may be obtained.

Therefore, when the product W4 and its development is long, if the whole product is displayed with the feature portions "crashed", according to the embodiment of the invention, the product W4 can be displayed by shortening its longitudinal direction and expanding the view when necessary, making it possible to recognize the feature portions of the product W4 all at the same time. In other words, it is easy to confirm and understand all the feature portions of the product W4, because not just one portion at the product W4 is expanded and displayed.

Explanation was made above of a case where scanning was carried out only in the left and right directions by referring to FIG. 9A. However, it is possible to shorten left and right directions and upper and lower directions by scanning in the upper and lower directions after completion of scanning in the left and right directions.

Apparent from the foregoing, according to the embodiments of the invention, for bending of a product, it is possible to easily lay out the dies in the press brake and it is easy to fetch die layout with respect to the bent product and reproduce the same.

Furthermore, it is easy to check interferences between the product and the dies during bending and even when the product is long, it is easy to confirm and understand all the feature portions of the product.

It should be understood that many modifications and adaptions of the invention will become apparent to those skilled in the art and the invention is intended to encompass such obvious modifications and changes in the scope of the claims appended hereto.

What is claimed:

1. A press brake comprising:
   at least one bending tool loaded in said press brake, said bending tool comprising reference data provided on a surface of said bending tool, said reference data including a reference number relating to said bending tool;
   a scanner for reading said reference data provided on said at least one bending tool, said scanner being movable relative to said at least one bending tool; and
   a position detecting device for detecting position data, said position data relating to a position at which said scanner reads said reference data, said position data is compared with position data detected during a previous scanning operation and determining whether it is possible to replace previously registered dies with new dies if it is determined that the bending operation cannot be performed with registered dies.

2. The press brake according to claim 1, further comprising:
   a device for correlating said position data detected by said position detecting device with said reference data read by said scanner;
   a memory device for storing said position data and said reference data correlated by said correlating device; and
   a display device for displaying said correlated data stored in said memory device.

3. The press brake according to claim 1, wherein said reference data comprises a bar code, said bar code being provided on an outer surface of said bending tool.

4. The press brake according to claim 3, wherein said scanner comprises a bar code scanner, said bar code scanner being adapted to scan and read said bar code provided on said bending tool.

5. The press brake according to claim 1, further comprising a guide member for supporting said scanner for movement relative to said bending tool.

6. The press brake according to claim 5, wherein said guide member is provided on a frame of said press brake, said guide member supporting said scanner for movement in a substantially horizontal direction relative to said bending tool.

7. The press brake according to claim 1, wherein said position detecting device comprises a magnetic scale for detecting said position data.

8. A method for displaying a die layout in a press brake, said method comprising the steps of:

(a) displaying, on a display device, at least one pair of dies corresponding to a maximum bend line length of a product to be bent;

(b) displaying, on said display device, a diagram and a bend line portion of said product in an order of bending corresponding to said displayed dies;

(c) determining, based on said displayed diagram, said displayed bend line portion and said displayed dies, whether it is possible to perform a bending operation on said product;

(d) registering said displayed dies if it is determined that said bending operation can be performd;

(e) further displaying new dies corresponding to a bend line length of said displayed bend line portion if it is determined that said bending operation cannot be performed, and registering said displayed new dies;

(f) determining whether it is possible to replace previously registered dies by said displayed new dies for bending said product;

(g) changing the registration by erasing said previously registered dies if it is determined that it is possible to replace the previously registered dies with said displayed new dies; and (h) displaying a next diagram and bend line portion of said product for a next bending operation within said order of bending by returning to step (b) and repeating the process of steps (b) through (h) until all bending operations within said order of bending have been analyzed.

9. A method according to claim 8, further comprising the step of selectively moving said displayed diagram said part relative to said displayed dies when it is determined that said bending operation cannot be performed, said step of further displaying new dies displaying said new dies when said displayed diagram is moved away from said displayed dies.

10. A method according to claim 8, wherein said step of determining whether it is possible to perform said bending operation comprises detecting whether there is an interference based on said displayed diagram and said displayed dies.

11. A method according to claim 10, wherein said determining determines that said bending operation cannot be performed when an interference is detected.

12. An apparatus for displaying a die layout in a press brake comprising:

a first storage part for storing product processing data, said product processing data relating to bend line lengths, a bending order and bent shapes and dimensions relating to a product;

a second storage part for storing data relating to die lengths and dimensions;

a display device controller for displaying, on a display device, a representation of said product at each stage in said bending order by fetching data from said first storage part and for displaying, on said display device, dies corresponding to bend line lengths of said product displayed in said display device by fetching data regarding die dimensions from said second storage part, and displaying new dies corresponding to a bend line length of a displayed bend line being displayed if it is determined that the bending operation cannot be performed; and a movement instructing device for selectively providing, to said display device controller, an instruction to move said product displayed on said display device.

13. A method for checking die interference for use in a system comprising a first memory for storing stereoscopic graphic data regarding a product, a second memory for storing cross-sectional shape data regarding dies necessary for bending said product, a display device for displaying data, and a display device controller for controlling the display of data on said display device, said method comprising:

transferring, from said first and second memories to said display device controller, edge shape data regarding a designated cross-sectional position of a stereoscopic shape of said product and cross-sectional shape data regarding said dies at a bending position;

displaying, in combination on said display device, an edge shape of the designated cross-sectional position of said product and cross-sectional shapes of said dies; and displaying new dies corresponding to a bend line length of a displayed bend line of the product if it is determined that a bending operation cannot be performed.

14. A method according to claim 13, further comprising displaying a stereoscopic image of said product on said display device, said stereoscopic image including a cut line representing said designated cross-sectionl position.

15. A method according to claim 14, further comprising moving said cut line to another designated cross-sectional position and displaying, based on said movement of said cut line, an edge shape of said product at said another designated cross-sectional position.

16. A method for checking die interferences, said method comprising the steps of:

displaying, on a display device, three-dimensional shape data regarding dies and a workpiece;

indicating, on said display device, a position for checking interferences with said workpiece and a sight line direction;

displaying shapes of said workpiece and said dies in the indicated sight line direction;

performing virtual bending of said workpiece on said display screen;

determining whether a sum of a cross-sectional area of said workpiece in a designated position and a cross-sectional area of said die is smaller than a fixed amount;

continuing the virtual bending process if it is determined that the sum is not smaller than the fixed amount;

stopping the virtual bending process and displaying three-dimensional shape data regarding a new die if it is determined that the sum is smaller than the fixed amount and checking interferences;

determining whether a sum of a cross-sectional area of said workpiece in the designated position and a cross-sectional area of the new die is smaller than a fixed amount; and performing the virtual bending process if it is determined that the sum is not smaller than the fixed amount.

17. A method for checking press brake interferences, said method comprising the steps of:

displaying, on a display device, three-dimensional data regarding an object to be interfered with and an object to be observed;

indicating, on the display screen, a position for checking interferences for the observed object and a sight line direction;

displaying shapes of the interfered object and the observed object in the indicated sight line direction;

moving the observed object toward the interfered object on the display screen;

determining whether a sum of a cross-sectional area of the interfered object and a cross-sectional area of a designated portion of the observed object is smaller than a fixed amount;

continuing the movement of the observed object if it is determined that the sum is not smaller than the fixed amount;

stopping the movement, and displaying a shape of a new observed object if it is determined that the sum is smaller than the fixed amount and checking interferences;

determining whether a sum of a cross-sectional area of the interfered object and a cross-sectional area of a designated portion of the new observed object is smaller than the fixed amount; and moving the new observed object toward the interfered object on the display screen if it is determined that the sum is not smaller than the fixed amount.

18. A method for displaying long parts of a product in reduced sizes, said method comprising the steps of:

storing, in a memory device, product data relating to a representation of said product with the long parts;

scanning said product data in a scanning direction with specified pitches, said scanning direction extending in a longitudinal direction of the representation of said product;

determining whether current coordinate data in a position orthogonal to said scanning direction is identical to coordinate data detected during a previous scanning operation;

omitting the current coordinate data if it is determined that the current coordinate data is identical to the previous coordinate data;

registering the current coordinate data if it is determined that the current coordinate data is not identical to the previous coordinate data; and displaying, after scanning said product data, the long parts of said product based on the registered coordinate data.

19. The method according to claim 18, further comprising the step of displaying the long parts, when the long parts are to be displayed based on the registered coordinate data, by magnifying the long parts by a predetermined amount.

20. The method according to claim 18, wherein said registering comprises storing said current coordinate data as data adjacent to a previous registered data with respect to the longitudinal direction of said product.

* * * * *

UNITED STATES PATENT AND TRADEMARK OFFICE
CERTIFICATE OF CORRECTION

PATENT NO. : 5,983,688
DATED : November 16, 1999
INVENTOR(S) : T. ANZAI et al.

It is certified that error appears in the above-identified patent and that said Letters Patent is hereby corrected as shown below:

On the cover of the printed patent, at Item [76], Inventors, "350, Ishida, Isehara-shi" should be ---Kanagawa---.

On the cover of the printed patent, at Item [57], Abstract, line 4, "clues" should be ---dies---.

At column 10, line 36 (claim 1, line 11) of the printed patent, "is" should be ---being---.

At column 11, line 37 (claim 9, line 2) of the printed patent, after "diagram" insert ---of---.

At column 12, line 6 (claim 13, line 1) of the printed patent, "interference" should be ---interferences---.

At column 12, line 27 (claim 14, line 4) of the printed patent, "crosssectionl" should be ---cross-sectional---.

Signed and Sealed this

Twenty-seventh Day of March, 2001

Attest:

NICHOLAS P. GODICI

Attesting Officer

Acting Director of the United States Patent and Trademark Office